United States Patent
Cole et al.

(10) Patent No.: US 10,646,906 B2
(45) Date of Patent: May 12, 2020

(54) MECHANISM FOR RETENTION OF MULTIPLE APPARATUS ON PLUMBING TOOLS

(71) Applicant: Ridge Tool Company, Elyria, OH (US)

(72) Inventors: Alex M. Cole, Columbia Station, OH (US); Jon R. Dunkin, Elyria, OH (US)

(73) Assignee: Ridge Tool Company, Elyria, OH (US)

( * ) Notice: Subject to any disclaimer, the term of this patent is extended or adjusted under 35 U.S.C. 154(b) by 311 days.

(21) Appl. No.: 15/825,237

(22) Filed: Nov. 29, 2017

(65) Prior Publication Data
US 2019/0160499 A1    May 30, 2019

(51) Int. Cl.
| | |
|---|---|
| *B08B 9/00* | (2006.01) |
| *B08B 9/045* | (2006.01) |
| *B08B 9/051* | (2006.01) |
| *E03C 1/302* | (2006.01) |
| *E03F 9/00* | (2006.01) |
| *F16L 3/015* | (2006.01) |

(52) U.S. Cl.
CPC .............. *B08B 9/045* (2013.01); *B08B 9/051* (2013.01); *E03C 1/302* (2013.01); *E03F 9/005* (2013.01); *F16L 3/015* (2013.01)

(58) Field of Classification Search
CPC ............... B08B 9/02; B08B 9/04; F16L 55/24
See application file for complete search history.

(56) References Cited

U.S. PATENT DOCUMENTS

| | | | |
|---|---|---|---|
| 2,926,372 A | 3/1960 | O'Brien | |
| 3,246,354 A * | 4/1966 | Cooney ................... | B08B 9/045 15/104.33 |
| 3,747,153 A | 7/1973 | O Neill | |
| 4,364,139 A | 12/1982 | Babb et al. | |
| 5,031,263 A * | 7/1991 | Babb ....................... | B08B 9/045 15/104.31 |
| 5,193,242 A | 3/1993 | Irwin | |
| 5,309,595 A | 5/1994 | Salecker et al. | |
| 6,009,588 A * | 1/2000 | Rutkowski .............. | B08B 9/045 15/104.33 |
| 2016/0175899 A1* | 6/2016 | Dunkin .................... | B08B 9/04 15/104.33 |

* cited by examiner

*Primary Examiner* — Michael D Jennings
(74) *Attorney, Agent, or Firm* — Mark E. Bandy; Rankin, Hill & Clark LLP

(57) ABSTRACT

A mechanism for securing multiple apparatus to a drain cleaning machine is described. The mechanism includes a bracket arranged on a frame of the drain cleaning machine. The bracket allows a drum and a feed mechanism to be removably secured to the frame. The bracket includes a base and pivotable latch. A drum bearing from the drum can be secured between the base and the latch when the latch is in a closed position. Mounting pins from the feed mechanism can be inserted into two bores in the bracket, and secured therein by plunger pins. One plunger pin is manually operated, to selectively lock the latch in the closed position, and to selectively secure one of the mounting pins in one of the bores. Another plunger pin is operated by pivoting of the latch, and functions to selectively secure the other mounting pin in the other bore.

32 Claims, 15 Drawing Sheets

MECHANISM FOR RETENTION OF MULTIPLE APPARATUS ON PLUMBING TOOLS

FIELD

The present subject matter generally relates to a drain cleaning apparatus. More specifically, the present subject matter relates to a drain cleaning apparatus including a bracket for removably securing a drum and a feed mechanism to a frame of the drain cleaning apparatus.

BACKGROUND

Drain cleaning machines typically include a rotating drum that is mounted on a frame. A cable is coiled inside the drum and is dispensed out of the front of the drum and into a drain or sewer pipe to clean out debris that has collected in the drain pipe. Often, drain cleaning machines also include a cable feed mechanism mounted on the frame that moves the cable in and out of the drum and into and out of the drain pipe. The drum, feed mechanism, and other apparatus are secured to the frame by mechanical fasteners.

In operation, different size cables may be used depending on the size of the drain pipe and the accessibility of the pipe. If the entire length of the cable is dispensed from the drum during drain cleaning, or if the cable breaks or is damaged, it may be required to remove the first drum and install a second drum with another cable on the machine. The process of replacing the first drum can involve several steps to detach and remove the first drum, and then attach a second drum to the machine. Such steps may require other apparatus, such as the feed mechanism, to also be removed from the machine in order to access and remove the first drum.

For example, replacing a drum on a drain cleaning apparatus that has a cable feed mechanism often involves numerous steps including first removing the feed mechanism from the frame of the machine. This process can include unscrewing mechanical fasteners holding the feed mechanism to the frame and then removing the feed mechanism from the frame. This is followed by unscrewing mechanical fasteners holding a latch that secures the drum on the frame, releasing the latch, and then removing the first drum. Moreover, these numerous steps are required to be performed in the reverse sequence in order to install the second drum on the machine. These numerous steps can be time consuming and tedious, and cause delay at a worksite and therefore incur additional labor expense. Furthermore, separate tools (such as screwdrivers, wrenches, socket sets, or drills) are required to unscrew the mechanical fasteners holding the feed mechanism to the frame and holding the latch.

Accordingly, a need exists for a simpler, easier to perform, and less time consuming manner in which to replace a drum on a drain cleaning apparatus.

SUMMARY

The difficulties and drawbacks associated with previous approaches are addressed in the present subject matter as follows.

In one aspect, the present subject matter provides a bracket for mounting a drum and a feed mechanism to a frame of a drain cleaning apparatus. The bracket comprises a base and a latch. The base is for connecting the bracket to the frame of the drain cleaning apparatus. The base includes first and second bores. The latch is pivotably mounted on the base and movable between an open position and a closed position. The first and second bores are configured to accept mounting pins of the feed mechanism for mounting the feed mechanism to the base. When the latch is in the closed position, a space between the latch and the base is configured to accept a drum bearing of the drum for mounting the drum to the base.

In another aspect, the present subject matter provides a bracket for removably securing a drum bearing and a feed mechanism to a frame of a drain cleaning apparatus. The bracket comprises a base for connecting the bracket to the frame of the drain cleaning apparatus. The base includes first and second bores, and a first plunger pin that is moveable between a first position in which the first plunger pin impinges upon the first bore, and a second position in which the first plunger pin does not impinge upon the first bore. The bracket also includes a latch pivotably mounted on the base and movable between an open position and a closed position. The latch includes a second plunger pin that is moveable between a first orientation in which the second plunger pin impinges upon the second bore when the latch is in the closed position, and a second orientation in which the second plunger pin does not impinge upon the second bore when the latch is in the closed position. The bracket includes a hinge pivotably connecting the latch to the base.

In still another aspect, the present subject matter provides drain cleaning apparatus comprising a frame, a bracket, a drum, and a feed mechanism. The bracket includes a base, a latch, and a hinge pivotably connecting the latch to the base. The base is arranged on the frame and includes first and second bores, and a first plunger pin that is moveable between a first position in which the first plunger pin impinges upon the first bore, and a second position in which the first plunger pin does not impinge upon the first bore. The latch is pivotably mounted on the base and is movable between an open position and a closed position. The latch includes a second plunger pin that is moveable between a first orientation in which the second plunger pin impinges upon the second bore when the latch is in the closed position, and a second orientation in which the second plunger pin does not impinge upon the second bore when the latch is in the closed position. The drum is rotatably and removably secured to the bracket and is rotatable about a rotation axis. The drum includes a drum bearing. The feed mechanism is removably secured to the bracket, and when actuated, axially displaces a cable inwardly or outwardly of the drum. The feed mechanism includes a first mounting pin and a second mounting pin. The drum is removably secured to the bracket when the drum bearing is arranged between the base and the latch, and the latch is secured in the closed position. The feed mechanism is removably secured to the bracket when the first mounting pin is fully inserted in the first bore, the second mounting pin is fully inserted in the second bore, the latch is in the closed position, the first plunger pin is in the first position, and the second plunger pin is in the first orientation.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
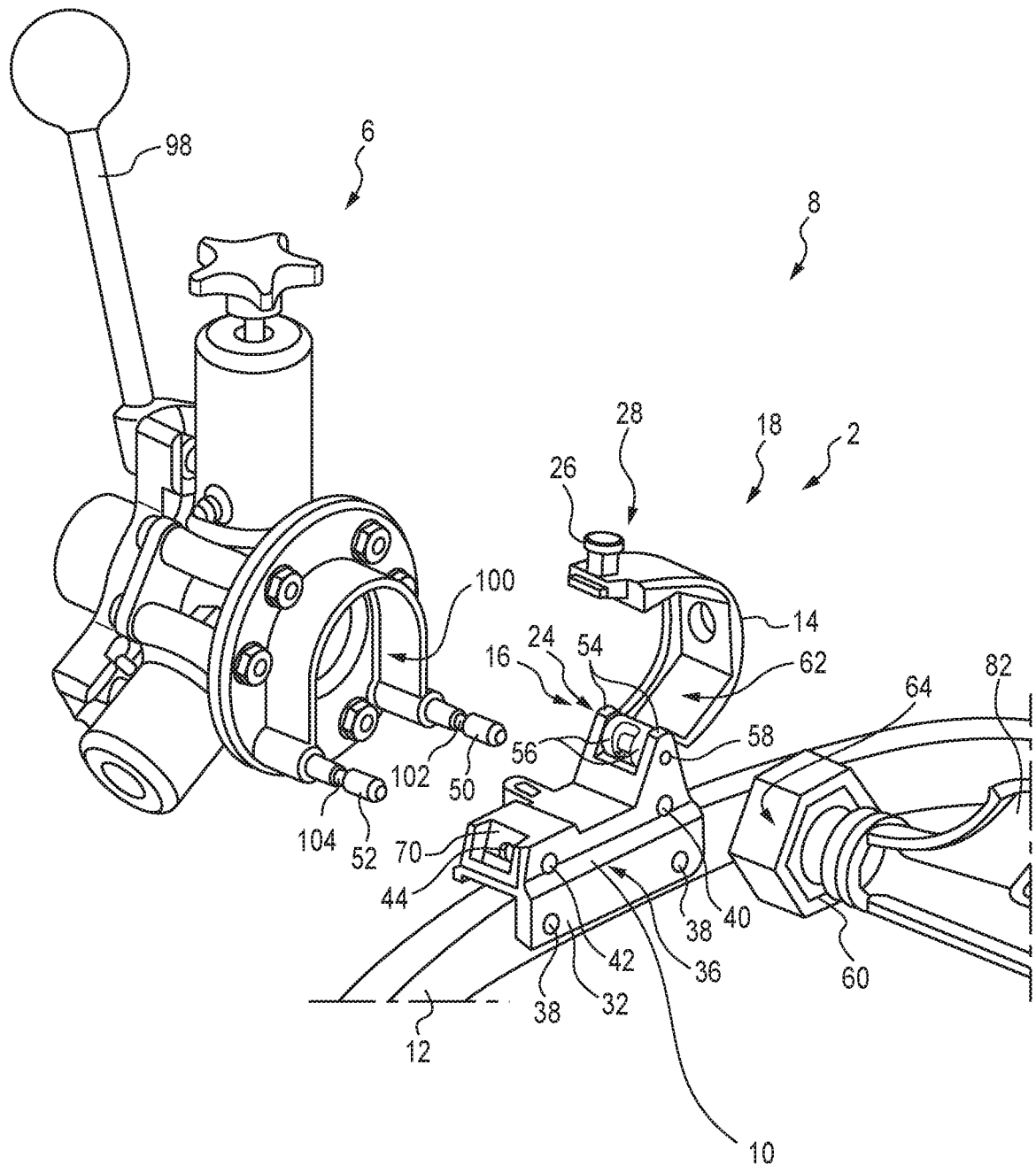
FIG. 1 is a perspective view illustrating a portion of a drain cleaning apparatus including a bracket, a feed mechanism, and a drum bearing in a disassembled configuration in accordance with the present subject matter.

With reference to the figures, the present subject matter provides a single bracket 2 for removably securing both a drum 4 and a cable feed mechanism 6 to a drain cleaning apparatus 8 (also referred to herein as drain cleaning machine, drain cleaner, or machine). The bracket 2 permits easy manual attachment and removal of both the feed mechanism 6 and the drum 4 to and from the drain cleaner 8 by hand, and without requiring separate tools. The bracket 2 is not particularly limited by the present subject matter, and can be constructed from metal, polymers, or other materials and combinations thereof. In one non-limiting embodiment, the bracket 2 is constructed from metal.

The bracket 2 includes a base 10 that is connected to a frame 12 of the drain cleaning apparatus 8, and a latch 14 that is pivotably mounted at its proximal end 16 to the base 10. The latch 14 is movable between an open position 18 (FIGS. 1, 2, 6, 8) and a closed position 20 (FIGS. 3, 4, 5, 7, 9). The base 10 includes a first spring loaded plunger pin 22 arranged at the proximal end 16 of the latch 14 and located near a hinge 24 that pivotably connects the latch 14 to the base 10. A second spring loaded plunger pin 26 is arranged at a distal end 28 of the latch 14. The first plunger pin 22 is operated by movement of the latch 14 between the open position 18 and the closed position 20, and the second plunger pin 26 may be manually operated without requiring the use of separate tools.

In one embodiment depicted in FIGS. 1-9 for example, the bracket 2 is separate from the frame 12. In this embodiment, the base 10 includes a front flange 30 and a rear flange 32 extending down from the front 34 and the rear 36, respectively, of the base 10. The bracket 2 can be releasably arranged/mounted to the frame 12 with one or more mechanical fasteners (not shown) extending through holes 38 arranged on the front flange 30 and the rear flange 32. In another embodiment depicted in FIGS. 10-14 for example, the drain cleaning apparatus 8 is very similar as in the embodiment depicted in FIGS. 1-9, except that the base 10 of the bracket 2 and the frame 12 are one integral structure 108 instead of being separate components that are attached with mechanical fasteners. The integral structure 108 including the base 10 and frame 12 can be formed by integral forming techniques including casting, molding, welding, or the like. In this embodiment, the base 10 is arranged on the frame 12, as they are one integral structure 108, and therefore the bracket 2 does not require holes 38 or fasteners for attaching the bracket 2 to the frame 12.

The base 10 includes a first bore 40, a second bore 42, a third bore 44, and a fourth bore 110. The first bore 40 and the second bore 42 run from the front 34 to the rear 36 of the base 10, and open at least to the front 34, and optionally also to the rear 36 of the base 10, e.g. a through bore. The third bore 44 runs transverse to the first and second bores 40, 42, and originates from a locking side 46 of the base 10, runs towards a hinge side 48 of the base 10, and intersects with and terminates in the second bore 42. The fourth bore 110 runs transverse to the first bore 40 and the second bore 42, originates from a top of the base 10, runs toward a bottom of the base 10, and intersects with and terminates in the first bore 40. The fourth bore 110 is sized to accept the first plunger pin 22 and to allow the first plunger pin 22 to extend therethrough and into the first bore 40. The first and second bores 40, 42 are arranged and sized to accept respective first and second mounting pins 50, 52 of the feed mechanism 6, wherein the first mounting pin 50 can fit into the first bore 40 and the second mounting pin 52 can fit into the second bore 42. The third bore 44 is sized to accept the second plunger pin 26, or at least a portion (e.g. tip) thereof.

The base 10 includes two knuckles 54, 54 on the hinge side 48 of the base, which mate with knuckle(s) 56, 56 on the proximal end 16 of the latch 14. The knuckles 54, 54, 56, 56 are held together by a hinge pin 58 to form the pivotable hinge 24 between the base 10 and the latch 14.

The latch 14 is pivotable about the hinge 24 between the open position 18 and the closed position 20. The latch 14 forms a curved shape between the proximal and distal ends 16, 28, such that when the latch 14 is in the closed position 20, the latch 14 and the base 10 form an annular-like enclosure 92 in which a drum bearing 60 of the drum 4 can be secured to the bracket 2. The latch 14 has an interior surface 62 that may be shaped to mate with an exterior surface 64 of the drum bearing 60. In one embodiment, as depicted in the figures, the drum bearing 60 is in the shape of a hexagon type nut, and the interior surface 62 of the latch may include for example, planar sections that correspond in shape to the exterior surface 64 of the hexagon type nut of the drum bearing 60. The latch 14 also includes a collar 66, extending inward toward the annular-like enclosure 92. The collar 66 helps to surround the drum bearing 60 at the front of the bearing 60 when the latch 14 is in the closed position 20, and thereby inhibit the drum bearing 60 from being released from between the closed latch 14 and the base 10.

The second plunger pin 26 is arranged on a tab 68 at the distal end 28 of the latch 14. The tab 68 may be sized and shaped to fit within a recess 70 at the locking side 46 of the base 10 when the latch 14 is in the closed position 20.

Figure 6:
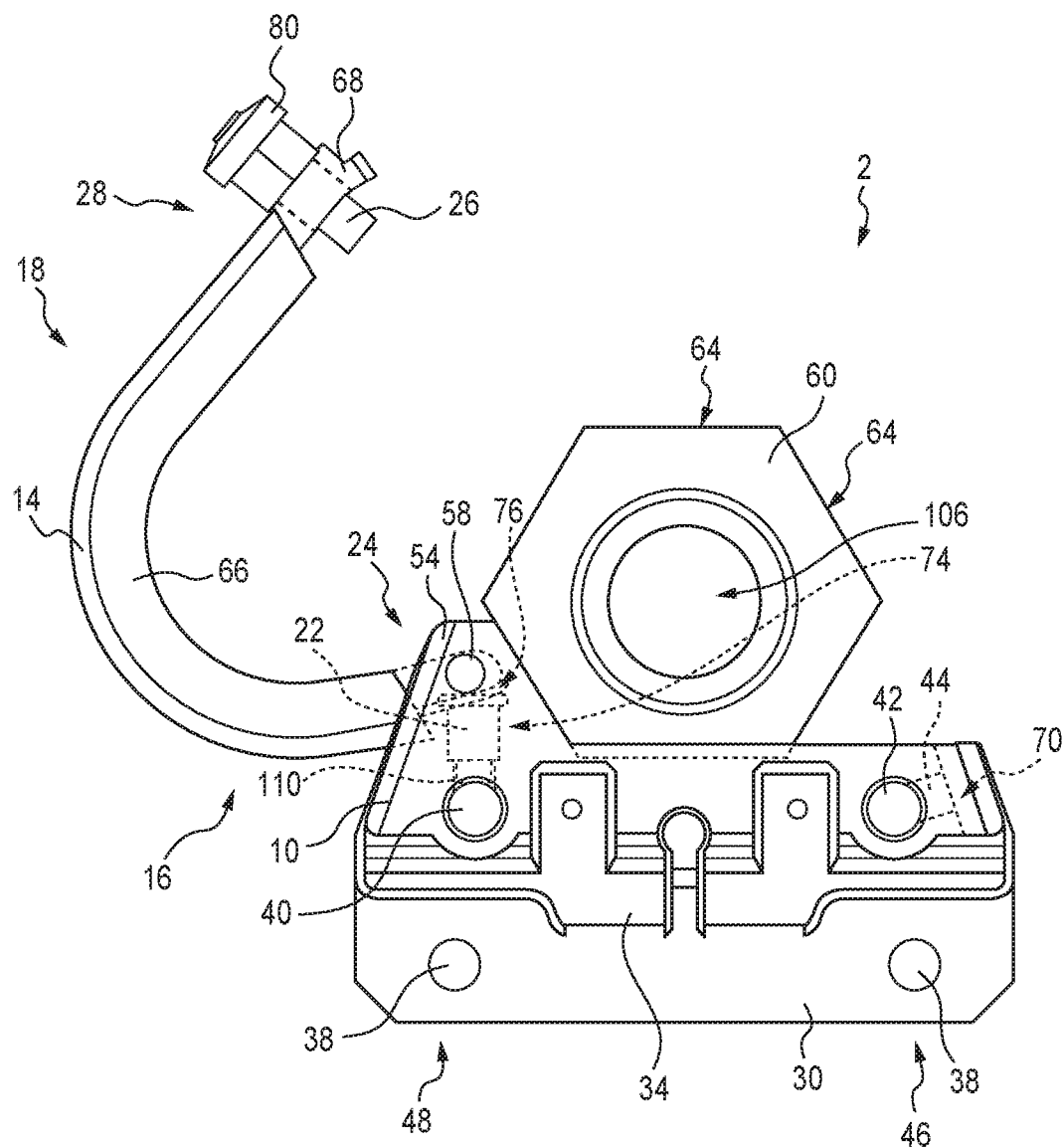
FIG. 6 is a front elevation view illustrating the bracket and drum bearing, with a latch of the bracket being in an open position in accordance with the present subject matter.
Figure 7:
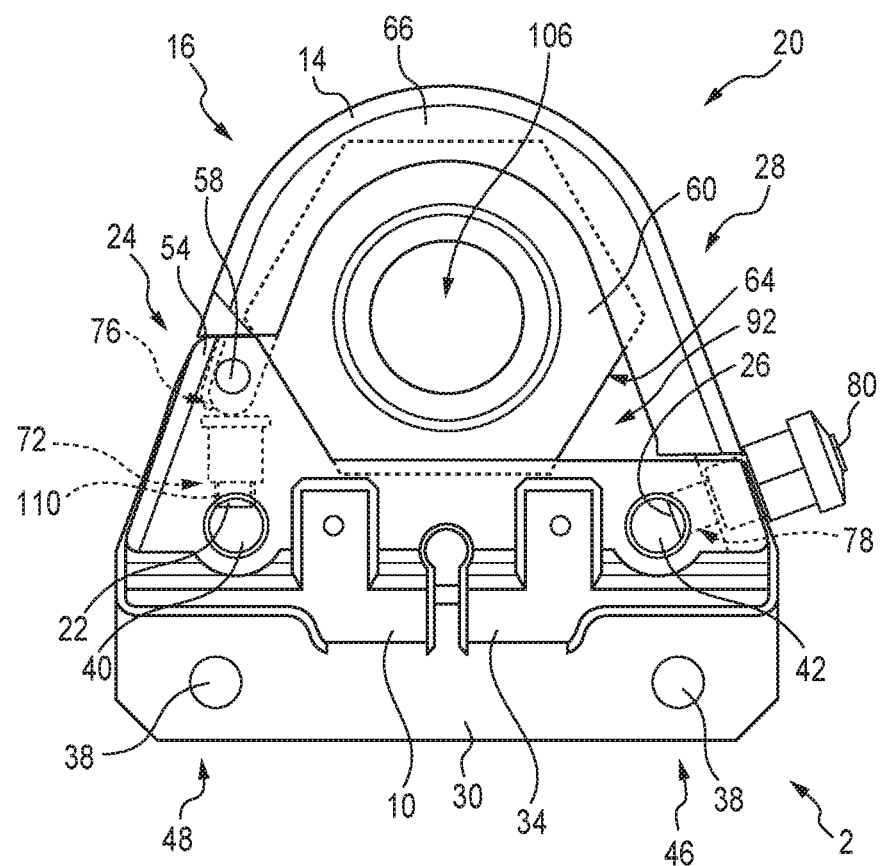
FIG. 7 is a view illustrating the bracket and drum bearing depicted in FIG. 6, with the latch being in a closed position.
Figure 8:
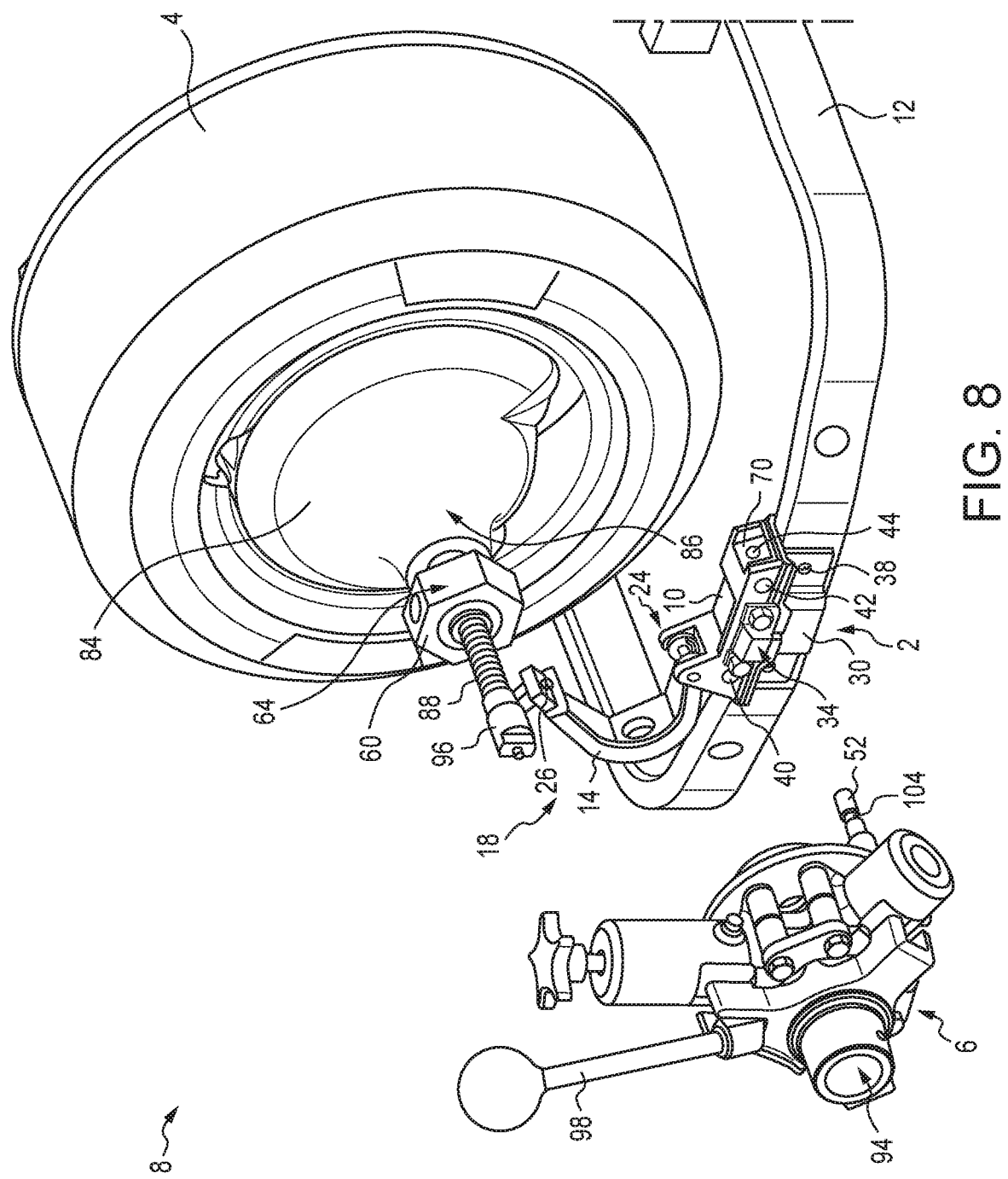
FIG. 8 is a perspective view illustrating a portion of a drain cleaning apparatus including a drum in a disassembled configuration in accordance with the present subject matter.
Figure 9:
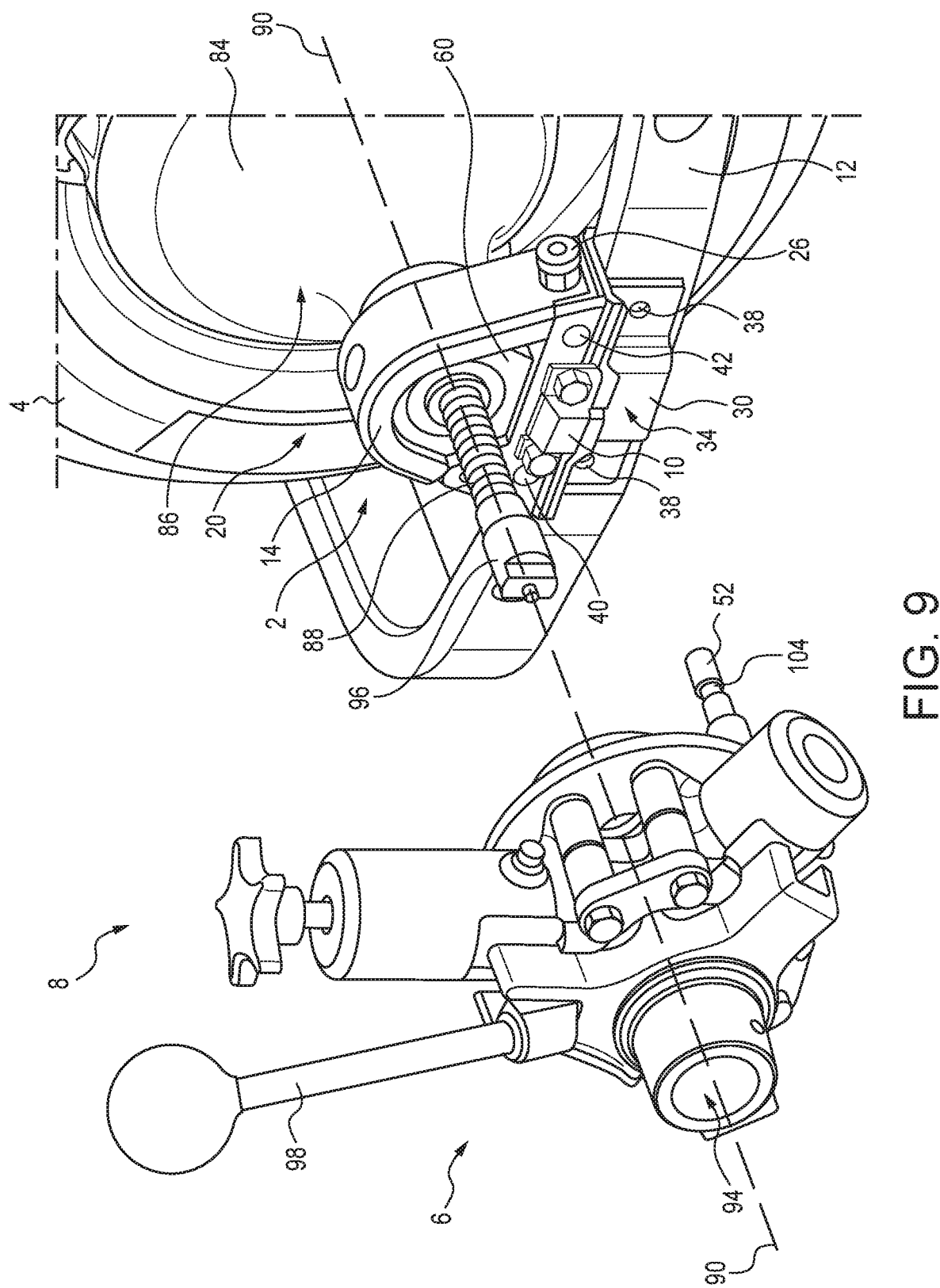
FIG. 9 illustrates the drain cleaning apparatus of FIG. 8 in a partially assembled configuration.
Figure 15:
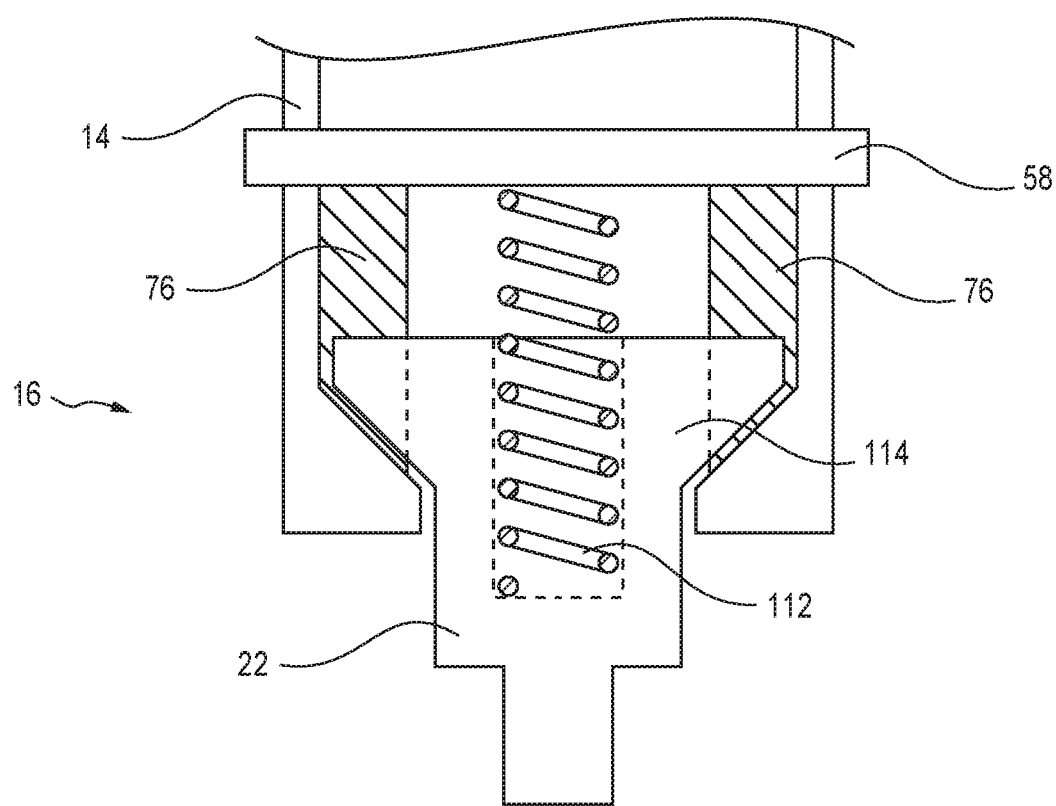
FIG. 15 is a cross sectional view illustrating a plunger pin and latch of a drain cleaning apparatus in accordance with the present subject matter.

The first plunger pin 22 is arranged in the fourth bore 110, and is moveable between a first position 72 in which the first plunger pin 22 impinges upon the first bore 40 (FIG. 7), and a second position 74 in which the first plunger pin 22 does not impinge upon the first bore 40 (FIG. 6). As used herein, "impinges upon" means that the plunger pins 22, 26 extend into the respective bores 40, 42. With particular reference to FIG. 15, this first plunger pin 22 is biased (e.g. with a spring 112) to the first position 72 and is held in place in the base 10 by a compression spring and pivot pin. A cam 76 is included on the proximal end 16 of the latch 14 and movement of the latch 14 about the hinge pin 58 causes movement of the cam 76. The first plunger pin 22 is operated by movement of the latch 14 between the open position 18 and the closed position 20, wherein the cam 76 interfaces with a head 114 of the first plunger pin 22 such that when the latch 14 is moved from the closed position 20 to the open position 18, the first plunger pin 22 is urged from the first position 72 to the second position 74 by engaging with the cam 76. More particularly, upon movement of the latch 14 from the closed position 20 to the open position 18, the cam 76 on the proximal end 16 of the latch 14 will engage the head 114 of the first plunger pin 22. Engagement between the moving cam 76 and the head 114 of the first plunger pin 22 causes the first plunger pin 22 to be pulled in an upward direction (arrow in FIG. 15), which results in compression of the spring 112, and causes the first plunger pin 22 to be removed from the first bore 40. Similarly, when the latch 14 is moved from the open position 18 to the closed position 20, the first plunger pin 22 is allowed to move (e.g. under the influence of a biasing spring 112) from the second position 74 back to the first position 72 to impinge upon the first bore 40.

The second plunger pin 26 is moveable between a first orientation 78 in which the second plunger pin 26 impinges upon the second bore 42 when the latch 14 is in the closed position 20 (FIG. 7), and a second orientation in which the second plunger pin does not impinge upon the second bore 42 when the latch 14 is in the closed position 20. That is, the second plunger pin 26 can be selectively moved in and out of the second bore 42 when the latch 14 is in the closed position 20. The second plunger pin 26 is biased to the first orientation 78. The second plunger pin 26 includes a grip or handle 80, which can be used for manually operating the second plunger pin 26 to move it from the first orientation 78, out of the second bore 42, out of the third bore 44, and to the second orientation (not shown) where the second plunger pin 26 does not impinge on the second bore 42 when the latch 14 is in the closed position 20 and is similar to the second position 74 of the first plunger pin 22. In other words, when the latch 14 is in the closed position 20, a user can grip the handle 80 by hand and manually pull the handle 80 such that the second plunger pin 26 is moved to the second orientation and out of the second bore 42. Release of the handle 80 by the user causes the second plunger pin 26 to move (e.g. under the influence of a biasing spring) back to the first orientation 78 and into the second bore 42.

The drum 4 is not particularly limited by the present subject matter, and can include a cable guide tube support shaft 82 (FIGS. 1-4) or a front drum housing 84 (FIGS. 5, 8, 9) at a front 86 of the drum 4 for guiding a cable 88 that is housed in an interior of the drum 4 as the cable 88 is being axially displaced inwardly or outwardly of the front 86 of the drum 4. The cable 88 passes through an aperture 106 in the drum bearing 60. The drum 4 includes the drum bearing 60, which, depending on the configuration, is connected to and upon which the cable guide tube support shaft 82 or the front drum housing 84 bear. The drum 4 is rotatably and selectively secured to the frame 12 and the drum 4 is rotatable about a rotation axis 90. The drum 4 is rotatable relative to the drum bearing 60.

Figure 2:
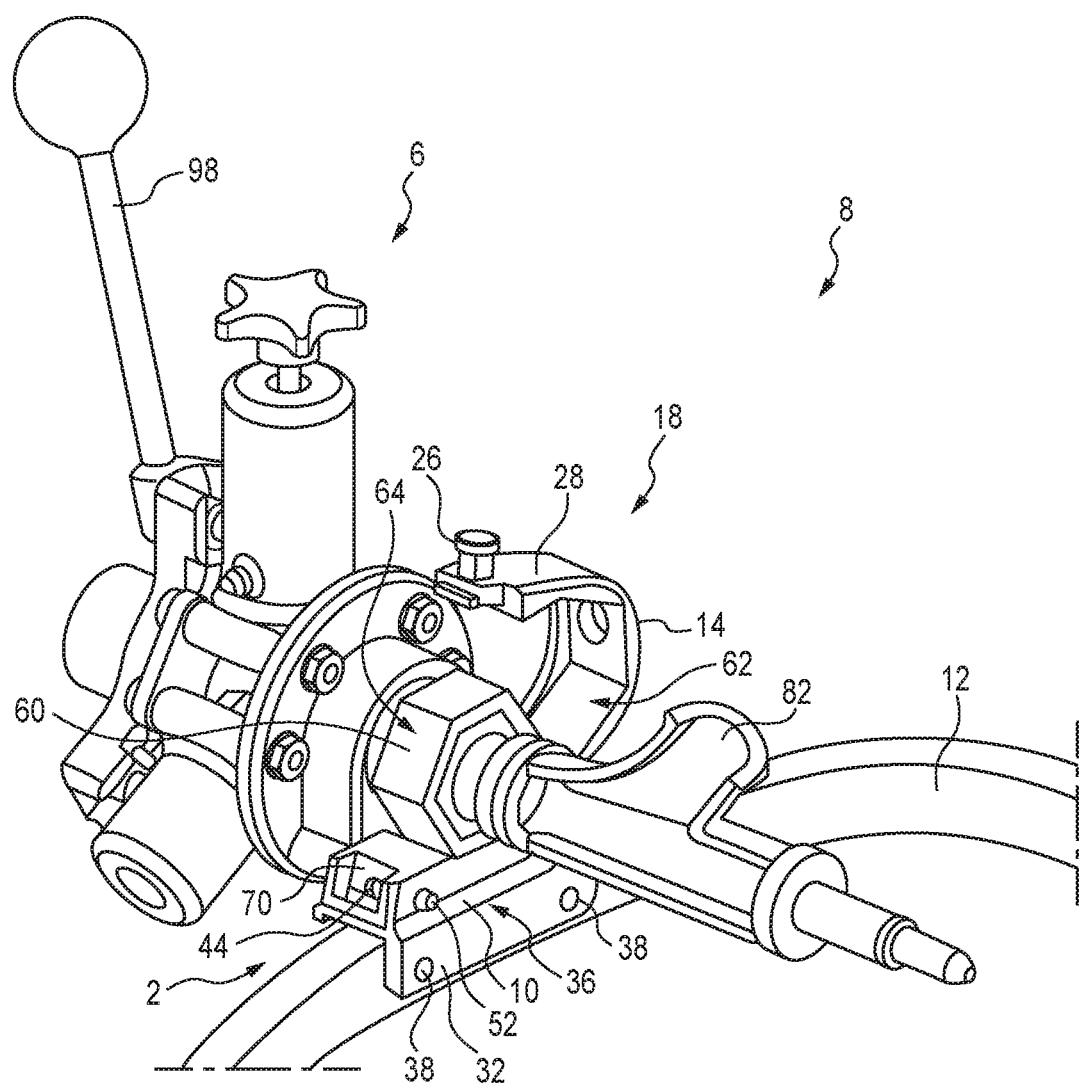
FIG. 2 is a view illustrating the drain cleaning apparatus depicted in FIG. 1 in a configuration that is intermediate between being disassembled and assembled.
Figure 3:
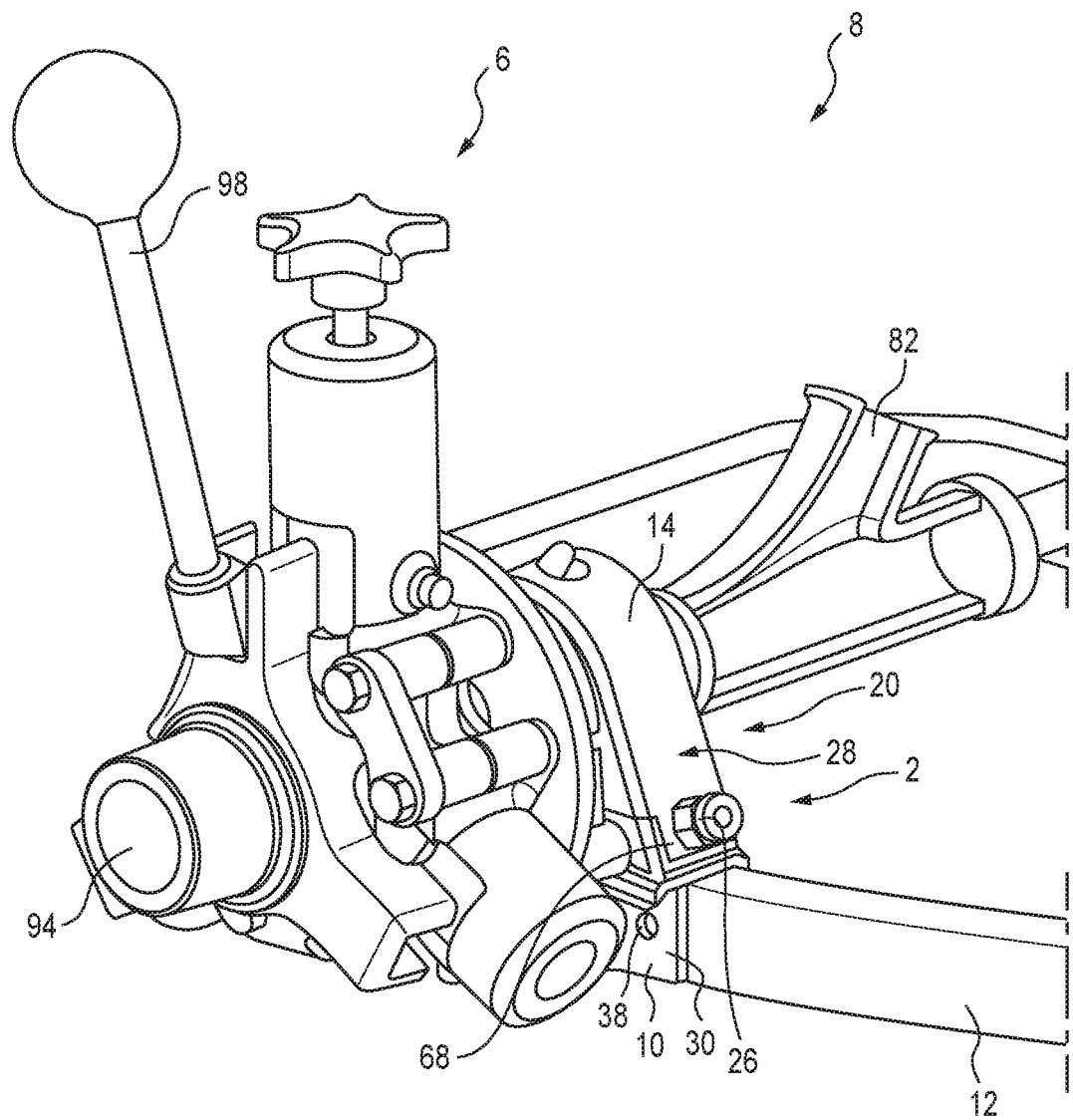
FIG. 3 is a perspective view illustrating the drain cleaning apparatus depicted in FIGS. 1-2 in a fully assembled configuration.
Figure 4:
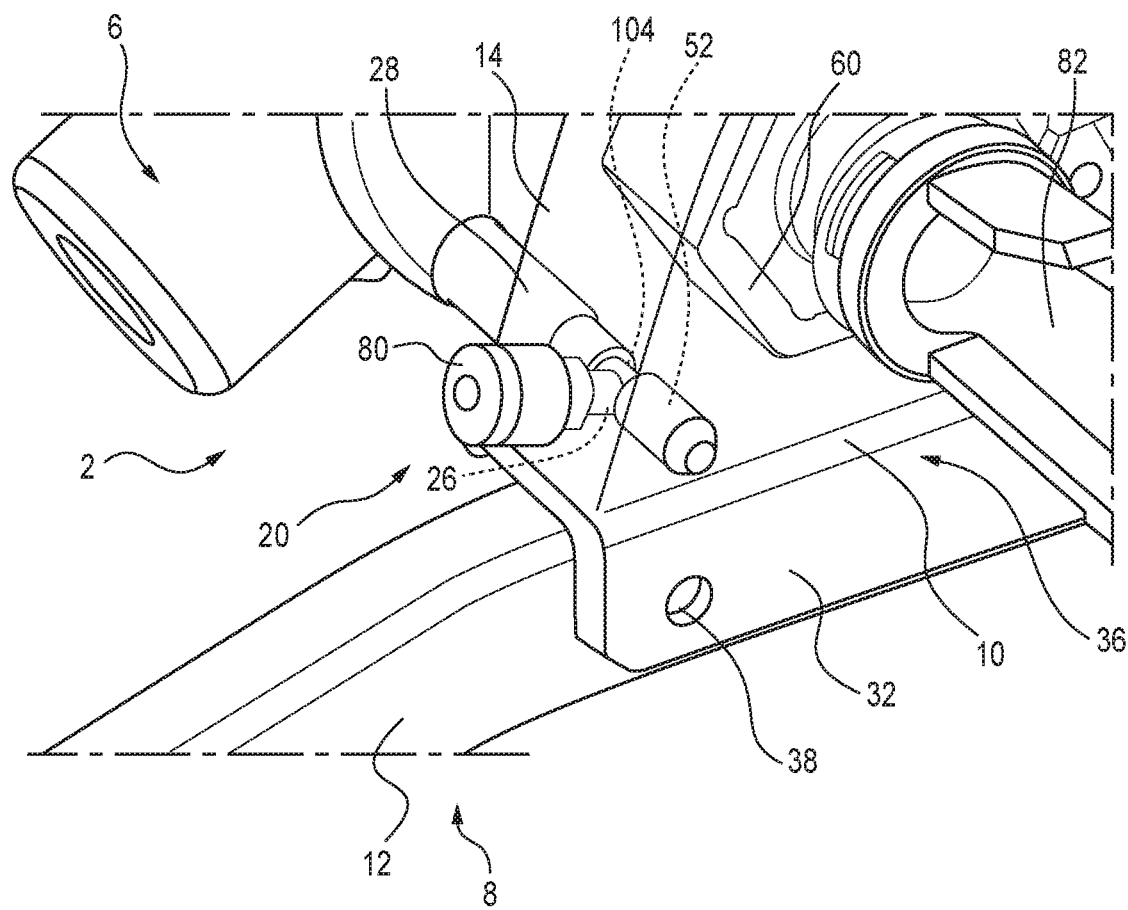
FIG. 4 is a cut away perspective view illustrating a detailed portion of a bracket of the drain cleaning apparatus depicted in FIGS. 1-3.
Figure 5:
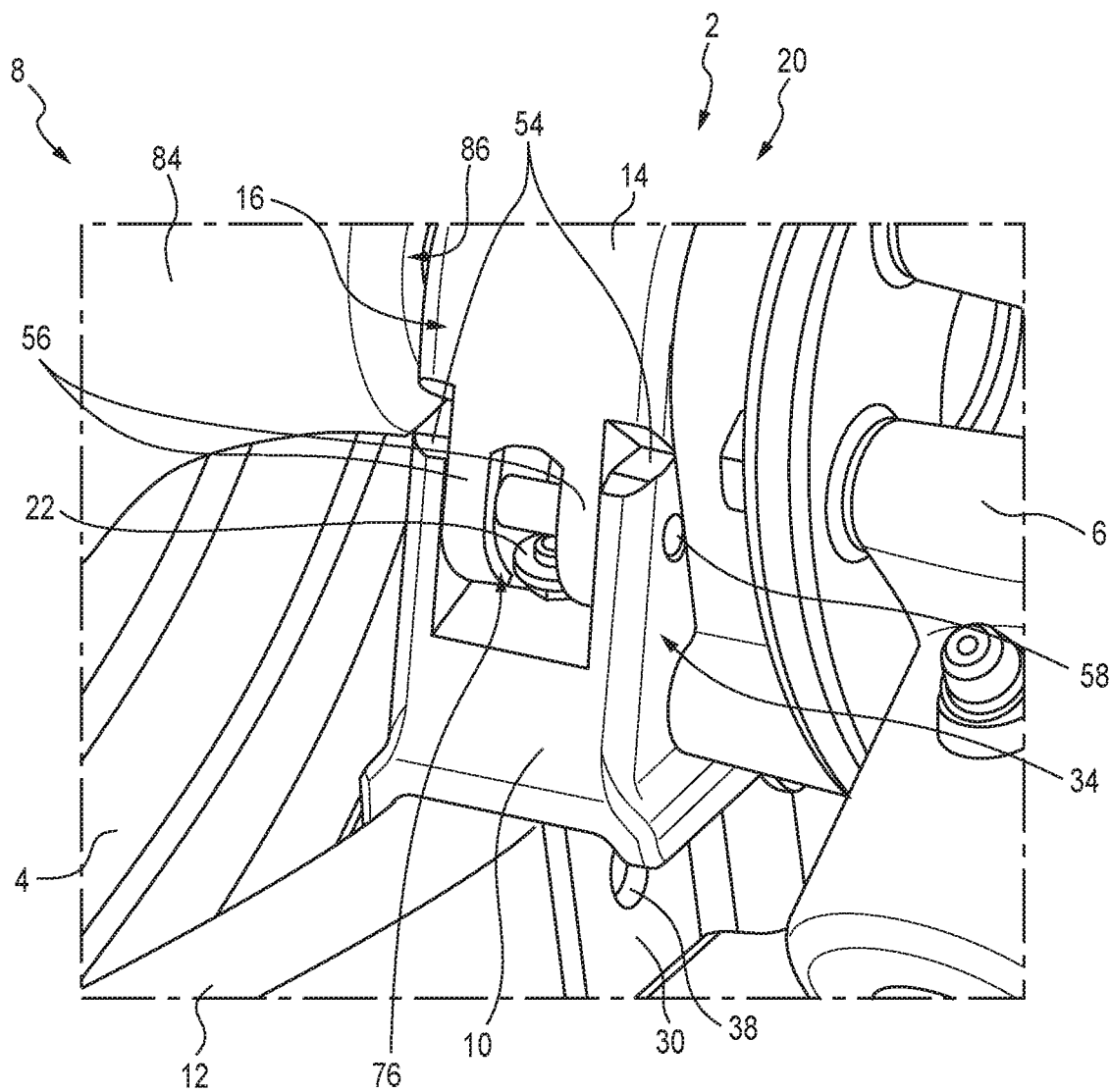
FIG. 5 is a perspective view illustrating another detailed portion of the bracket of the drain cleaning apparatus depicted in FIGS. 1-3.

To secure the drum 4 to bracket 2, the drum bearing 60 is placed between the latch 14 and the base 10 while the latch 14 is in the open position 18 (FIGS. 2, 6). The latch 14 is then pivoted to the closed position 20 and a distal end 28 of the latch 14 is secured to the base 10 by the second plunger pin 26 (FIGS. 3, 4, 5, 7, 9). When the latch 14 is in the closed position 20 and the second plunger pin 26 is in the first orientation 78, the second plunger pin 26 passes through the third bore 44 (and into the second bore 42) to secure or lock the latch 14 in the closed position 20. The drum bearing 60 is thereby secured in the annular-like enclosure 92 between the base 10 and the closed latch 14 while the drum 4 can be rotated about the rotation axis 90 relative to the secured drum bearing 60.

The feed mechanism 6 is not particularly limited by the present subject matter, and can include those known to skilled artisan and including rollers that selectively engage the cable 88 by use of a manually operated lever 98 in order to axially displace the cable 88 inwardly or outwardly of the front 86 of the drum 4.

Figure 10:
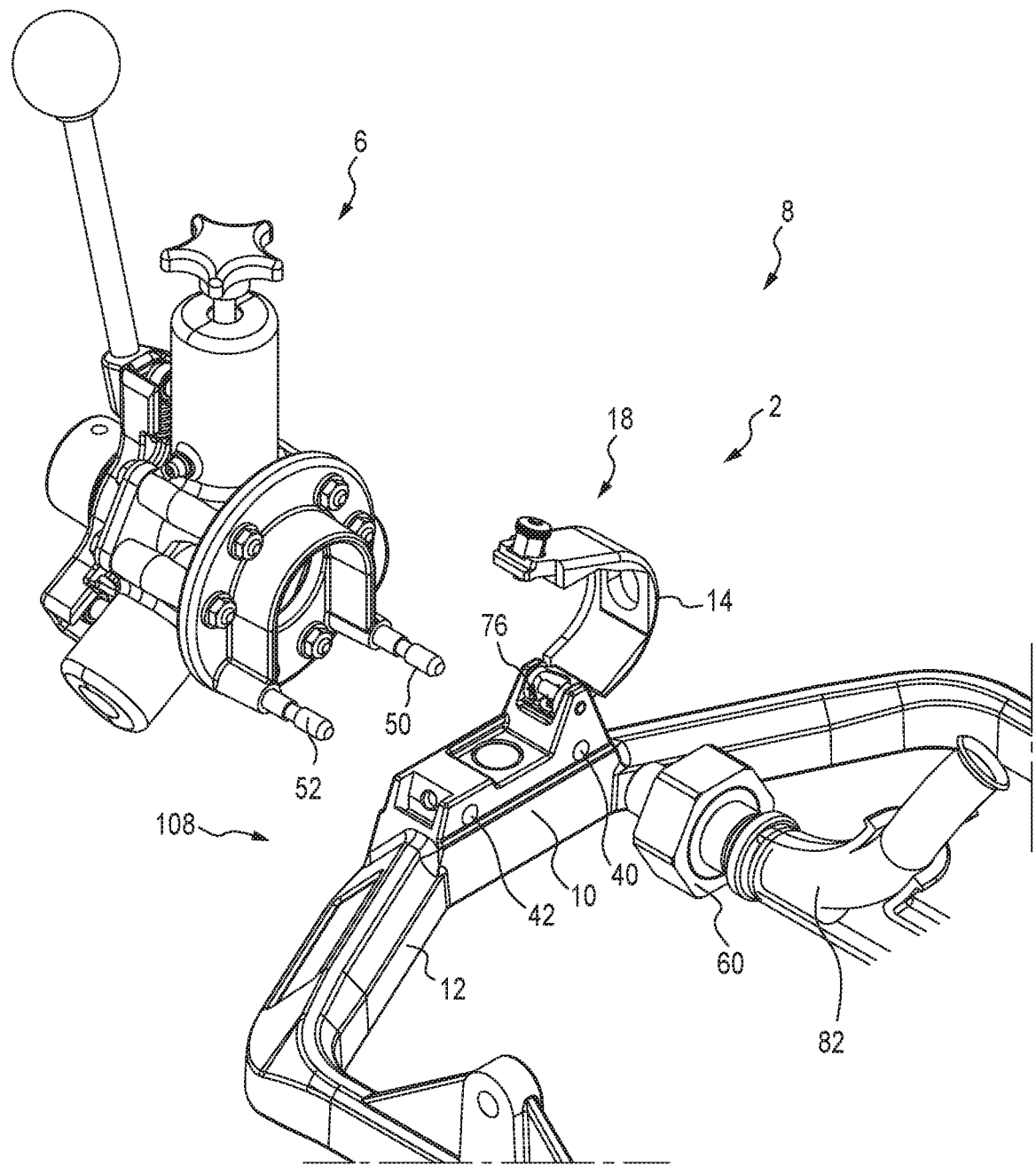
FIG. 10 is a perspective view illustrating a portion of a drain cleaning apparatus including an integral bracket base and frame, a feed mechanism, and a drum bearing in a disassembled configuration in accordance with the present subject matter.
Figure 11:
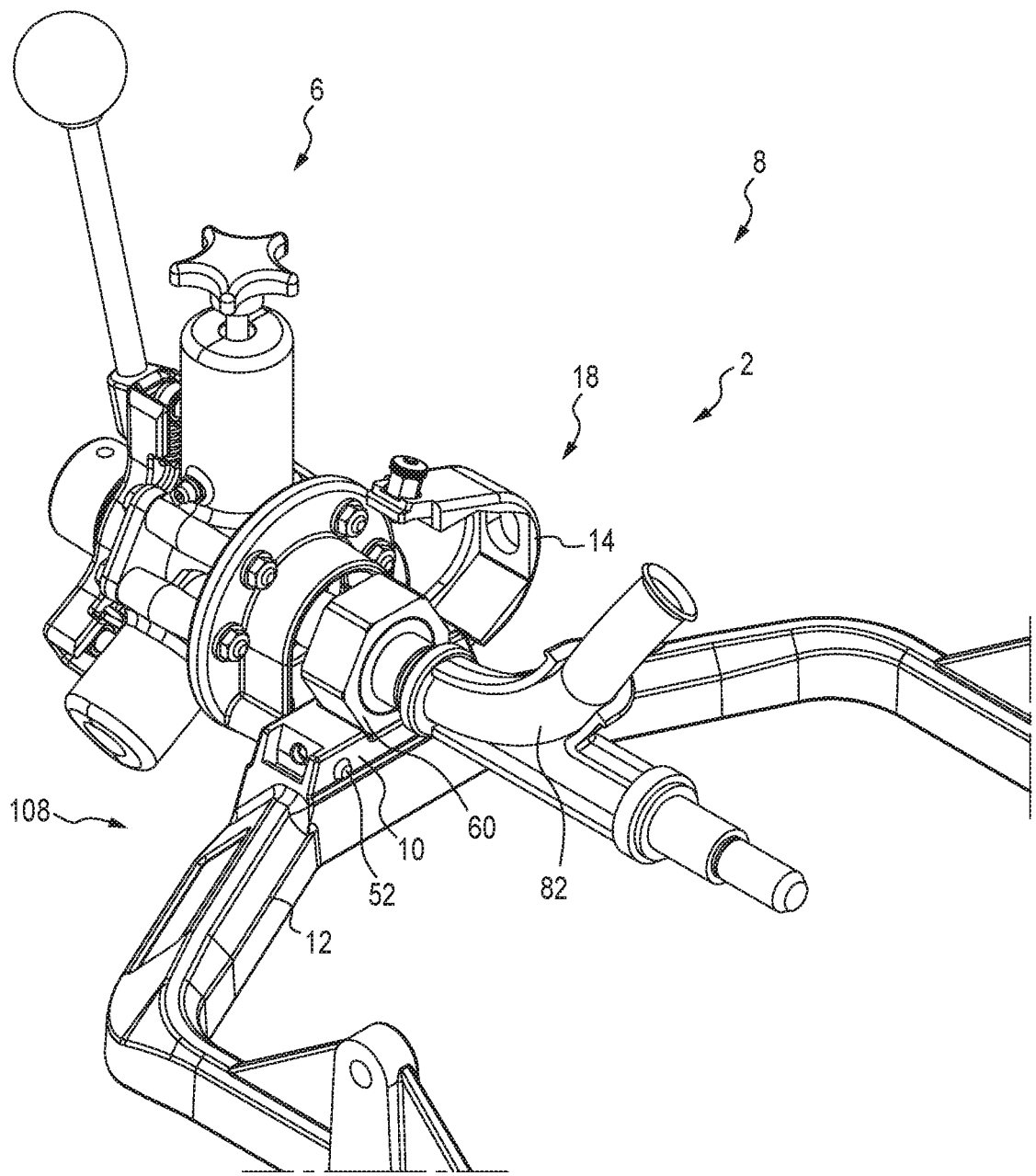
FIG. 11 is a view illustrating the drain cleaning apparatus depicted in FIG. 10 in a configuration that is intermediate between being disassembled and assembled.
Figure 12:
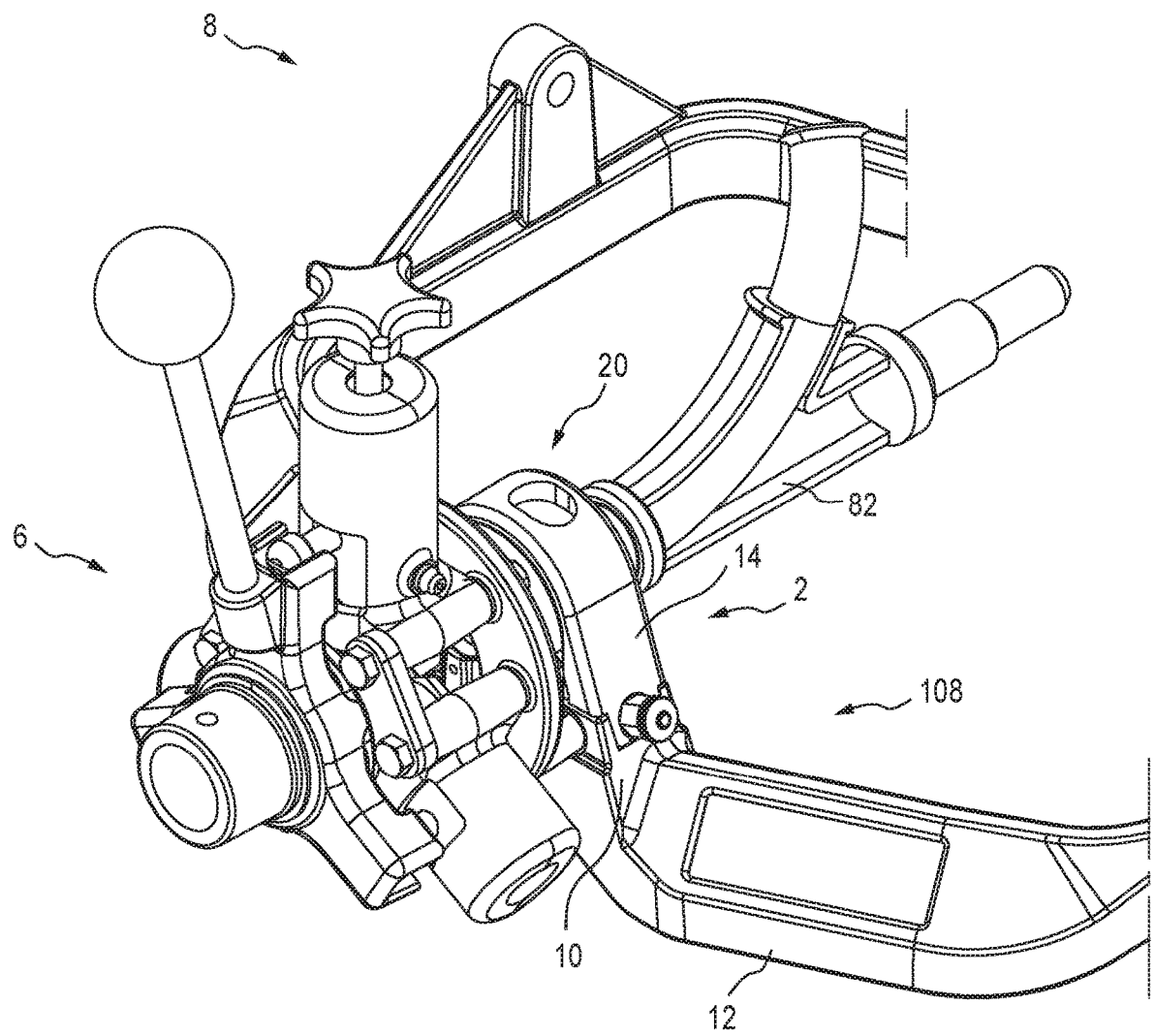
FIG. 12 is a perspective view illustrating the drain cleaning apparatus depicted in FIGS. 10-11 in a fully assembled configuration.
Figure 13:
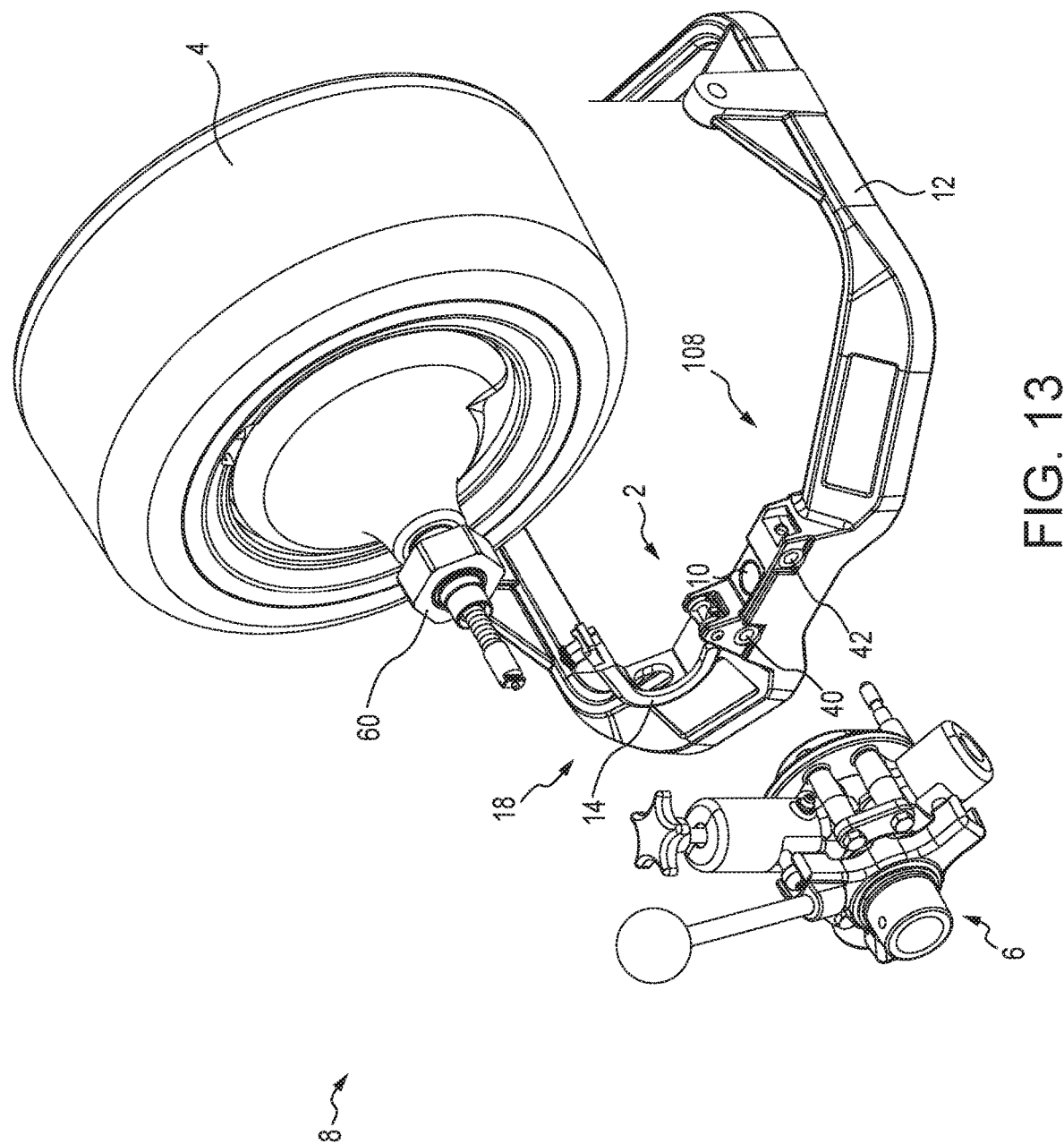
FIG. 13 is a perspective view illustrating a portion of a drain cleaning apparatus including an integral bracket base and frame and a drum, in a disassembled configuration in accordance with the present subject matter.
Figure 14:
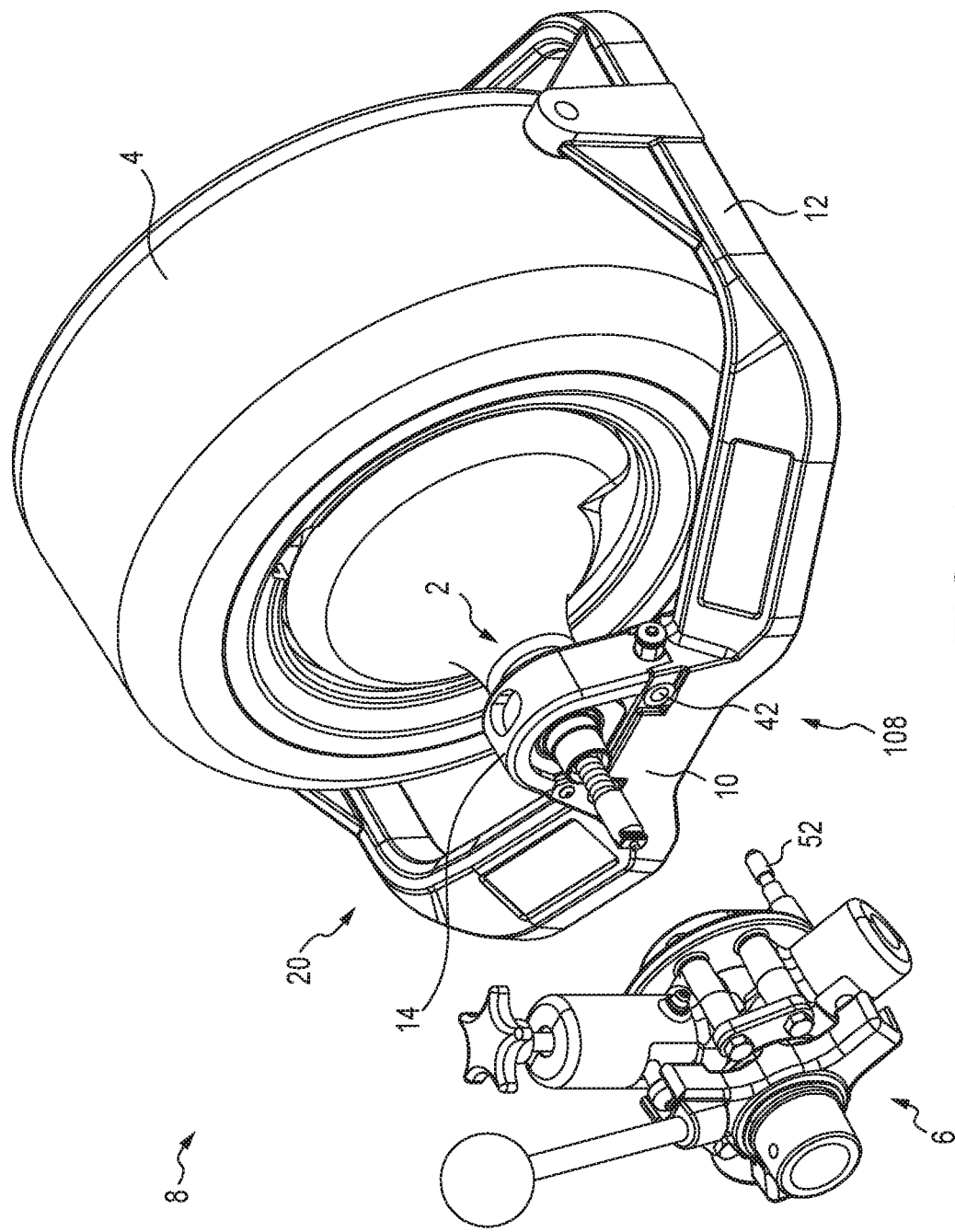
FIG. 14 illustrates the drain cleaning apparatus of FIG. 13 in a partially assembled configuration.

The feed mechanism 6 can be secured to the bracket 2 by inserting the first mounting pin 50 into the first bore 40 and inserting the second mounting pin 52 into the second bore 42 (e.g. as depicted between FIGS. 1 and 2 and between FIGS. 10 and 11). This process may require sliding an end 96 of the cable 88 through an aperture 94 in the feed mechanism 6. The first and second mounting pins 50, 52 are arranged at a rear 100 of the feed mechanism 6 and align the feed mechanism 6 with the bracket 2 when inserted in the first and second bores 40, 42.

The first mounting pin 50 includes a first depression 102, and the second mounting pin 52 includes a second depression 104. The first and second depressions 102, 104 may each be in the form of an annular groove as shown in the figures, or other arrangement. When the mounting pins 50, 52 are fully inserted into the first and second bores 40, 42 and the latch 14 is moved to the closed position 20 (e.g. as depicted between FIGS. 2 and 3, between FIGS. 6 and 7, and between FIGS. 11 and 12), the tip of the first plunger pin 22 is arranged inside the first depression 102 on the first mounting pin 50, and the tip of the second plunger pin 26 is arranged inside the second depression 104 on the second mounting pin 52 (FIG. 4) to thereby secure the feed mechanism 6 to the bracket 2. When the tip of the first plunger pin 22 is arranged inside the first depression 102, the first mounting pin 50 is secured inside the first bore 40 because the tip of the first plunger pin 22 inhibits removal of the first mounting pin 50 from the first bore 40. Similarly, the tip of the second plunger pin 26 being arranged inside the second depression 104 on the second mounting pin 52 secures the second mounting pin 52 inside the second bore 42 by inhibiting the second mounting pin 52 from being removed from the second bore 42. In other words, the mounting pins 50, 52 are retained in the bores 40, 42 by the first and second plunger pins 22, 26, respectively. In this way, the mounting pins 50, 52 are selectively secured in the first and second bores 40, 42 when the latch 14 is moved to the closed position 20.

When the latch 14 is in the open position 18, the first and second plunger pins 22, 26 do not impinge on the first and second bores 40, 42 (See FIG. 6) and therefore are not arranged in the first and second depressions 102, 104. In this way, when the latch 14 is in the open position 18, the mounting pins 50, 52 can be freely inserted and removed from the first and second bores 40, 42 since the plunger pins 22, 26 do not impinge upon the first and second bores 40, 42. However, because the plunger pins 22, 26 are spring loaded, even if the latch 14 is in the closed position 20 and the plunger pins 22, 26 impinge upon the first and second bores 40, 42, the mounting pins 50, 52 can still be inserted and secured in the first and second bores 40, 42. This is because as the mounting pins 50, 52 are being inserted into the first and second bores 40, 42, the mounting pins 50, 52 urge the respective spring loaded plunger pins 22, 26 out of the first and second bores 40, 42. When the depressions 102, 104 on the respective mounting pins 50, 52 align with the respective plunger pins 22, 26 (e.g. when the mounting pins 50, 52 are fully inserted), the plunger pins 22, 26 extend back into (e.g. under the influence of a biasing spring) the first and second bores 40, 42 and into the respective depressions 102, 104 to secure the mounting pins 50, 52 in the first and second bores 40, 42. In other words, the mounting pins 50, 52 can be inserted and secured in the first and second bores 40, 42 when the latch 14 is in the closed position 20, or can be inserted in the first and second bores 40, 42 when the latch 14 is in the open position 18 and thereafter secured in the first and second bores 40, 42 when the latch 14 is moved to the closed position 20.

The drum 4 and feed mechanism 6 can be removed from the drain cleaning apparatus 8 by moving the latch 14 to the open position 18. This can be accomplished by releasing the latch 14 from being locked in the closed position 20. Unlocking the latch 14 can include moving the second plunger pin 26 from the first orientation 78, out of the second bore 42 (which removes the second plunger pin 26 from the second depression 104 in the second mounting pin 52), out of the third bore 44, and to the second orientation. When the second plunger pin 26 is moved out of the third bore 44, the latch 14 is unlocked and can be freely pivoted about the hinge 24 from the closed position 20 to the open position 18. Movement of the latch 14 to the open position 18 allows for removal of the drum bearing 60 from the bracket 2 and the drum 4 from the drain cleaning apparatus 8 for replacement with another drum, repair of the drum 4 or cable 88, or for other purposes. Additionally, movement of the latch 14 to the open position 18 causes the first plunger pin 22 to move by engagement with the cam 76 from the first position 72, out of the first bore 40, out of the first depression 102 of the first mounting pin 50, and to the second position 74. When the first and second plunger pins 22, 26 no longer impinge on the first and second bores 40, 42 (i.e. removed from the first and second bores 40, 42), the mounting pins 50, 52 are free to be pulled out of the first and second bores 40, 42, and the feed mechanism 6 can then be removed from the bracket 2.

In one embodiment, a system for mounting multiple apparatus on a drain cleaning machine is provided and includes a bracket 2, a drum bearing 60, and first and second mounting pins 50, 52 as described herein. In this embodiment, it is possible for other apparatus, besides the feed mechanism 6, to be mounted on the bracket 2 as long as the other apparatus include mounting pins similar to those described herein for the feed mechanism 6 that mate with the first and second bores 40, 42 in the base 10. The system may further include other typical components of a drain cleaning machine 8 including the drum 4 rotatably connected to the drum bearing 60, the feed mechanism 6 connected to the first and second mounting pins 50, 52, the frame 12 upon which the bracket 2 is mounted with mechanical fasteners (FIGS. 1-10) or which is integral to the bracket 2 (FIGS. 10-14), a motor for rotating the drum 4, controls for operating the motor, wheels on the frame 12, a handle to facilitate moving the drain cleaning machine 8, and the like.

In another embodiment, a drain cleaning apparatus 8 is provided that includes the frame 12, the bracket 2, the drum 4 rotatably and removably secured to the frame 12, and the feed mechanism 6 removably secured to the bracket 2 as described herein. The drum 4 includes the drum bearing 60, and is rotatable about a rotation axis 90.

In another embodiment, a method of removably mounting multiple apparatus to a drain cleaning machine 8 is provided, and includes securing a drum 4 and feed mechanism 6 to a bracket 2 as described herein, which itself is secured (e.g. integrally attached, or attached by fasteners) to a frame 12 of the drain cleaning machine 8. The drum 4 and feed mechanism 6 can be selectively removed from the bracket 2 as described herein by manual operation of the latch 14 of the bracket 2 and by manual operation of the second plunger pin 26.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A drain cleaning apparatus comprising:
a frame,
a bracket including,
    a base arranged on the frame, the base including,
        first and second bores, and
        a first plunger pin that is moveable between a first position in which the first plunger pin impinges upon the first bore, and a second position in which the first plunger pin does not impinge upon the first bore,
    a latch pivotably mounted on the base and movable between an open position and a closed position, and including,
        a second plunger pin that is moveable between a first orientation in which the second plunger pin impinges upon the second bore when the latch is in the closed position, and a second orientation in which the second plunger pin does not impinge upon the second bore when the latch is in the closed position, and a hinge pivotably connecting the latch to the base;

a drum rotatably and removably secured to the bracket and being rotatable about a rotation axis, the drum including a drum bearing, a feed mechanism removably secured to the bracket, and that when actuated axially displaces a cable inwardly or outwardly of the drum, the feed mechanism including a first mounting pin and a second mounting pin, wherein the drum is removably secured to the bracket when the drum bearing is arranged between the base and the latch, and the latch is secured in the closed position, and wherein the feed mechanism is removably secured to the bracket when the first mounting pin is fully inserted in the first bore, the second mounting pin is fully inserted in the second bore, the latch is in the closed position, the first plunger pin is in the first position, and the second plunger pin is in the first orientation.

2. The drain cleaning apparatus according to claim 1, wherein:
the first mounting pin includes a first depression,
the second mounting pin includes a second depression, and
when the feed mechanism is removably secured to the bracket, a tip of the first plunger pin is arranged in the first depression to thereby removably secure the first mounting pin in the first bore, and a tip of the second plunger pin is arranged in the second depression to thereby removably secure the second mounting pin in the second bore.

3. The drain cleaning apparatus according to claim 2, wherein:
the base further includes a third bore that intersects with the second bore,
when the feed mechanism is removably secured to the bracket, the second plunger pin passes through the third bore to thereby to selectively secure the latch in the closed position.

4. The drain cleaning apparatus according to claim 3, wherein:
the second plunger pin includes a handle, and
the second plunger pin can be manually moved from the first orientation to the second orientation by pulling the handle, which thereby removes the second plunger pin from the third bore and removes the tip of the second plunger pin from the second depression.

5. The drain cleaning apparatus according to claim 4, when the drum bearing is removably secured to the bracket and the second plunger pin is moved from the first orientation to the second orientation, then the latch is released from being secured in the closed position and can be moved from the closed position to the open position, which allows the drum bearing to be removed from being secured to the bracket.

6. The drain cleaning apparatus according to claim 4, when the feed mechanism is removably secured to the bracket and the second plunger pin is moved from the first orientation to the second orientation, then the latch is released from being secured in the closed position and can be moved from the closed position to the open position, which allows the first mounting pin to be removed from the first bore and allows the second mounting pin to be removed from the second bore.

7. The drain cleaning apparatus according to claim 1, wherein the first plunger pin is biased to the first position and the second plunger pin is biased to the first orientation.

8. The drain cleaning apparatus according to claim 7, wherein when the latch is moved from the closed position to the open position, the latch urges the first plunger pin to move from the first position to the second position.

9. The drain cleaning apparatus according to claim 8, wherein:
the hinge attaches a proximal end of the latch to the base, and
the second plunger pin is arranged on a distal end of the latch.

10. The drain cleaning apparatus according to claim 9, wherein:
the latch includes a cam at the proximal end, and
when the latch is moved from the closed position to the open position, the cam engages the first plunger pin and urges the first plunger pin to the second position.

11. The drain cleaning apparatus according to claim 10, wherein when the latch is in the open position, the feed mechanism can be removably secured to the bracket by inserting the first mounting pin in the first bore, inserting the second mounting pin in the second bore, and then moving the latch to the closed position.

12. The drain cleaning apparatus according to claim 1, wherein when the drum bearing is removably secured to the bracket, the drum bearing can be selectively released from the bracket by moving the latch from the closed position to the open position and then removing the drum bearing from between the base and the latch.

13. The drain cleaning apparatus according to claim 1, wherein when the feed mechanism is removably secured to the bracket, the feed mechanism can be selectively released from the bracket by moving the latch from the closed position to the open position and then removing the first mounting pin from the first bore and removing the second mounting pin from the second bore.

14. The drain cleaning apparatus according to claim 1, wherein the first mounting pin can be inserted into the first bore and the second mounting pin can be inserted into the second bore when the latch is in the open position or in the closed position.

15. The drain cleaning apparatus according to claim 14, wherein:
when the latch is in the closed position, the feed mechanism can be removably secured to the bracket by inserting the first mounting pin into the first bore and inserting the second mounting pin into the second bore,
the first mounting pin initially urges the first plunger pin into the second position, and then the first plunger pin moves from the second position to the first position when the first depression aligns with the first plunger pin to thereby removably secure the first mounting pin in the first bore, and
the second mounting pin initially urges the second plunger pin into the second orientation, and then the second plunger pin moves from the second orientation to the first orientation when the second depression aligns with the second plunger pin to thereby removably secure the second mounting pin in the second bore.

16. The drain cleaning apparatus according to claim 1, wherein the base is integral with the frame.

17. The drain cleaning apparatus according to claim 1, wherein the base is releasably arranged to the frame.

18. A drain cleaning apparatus comprising:
an integral structural component defining a base and a frame integral with the base;
a cable feed mechanism including a mounting pin defining a longitudinal axis and a peripheral depression, wherein the base defines a bore dimensioned and axially aligned to receive the mounting pin;
a drum mounted on the integral structural component and including a drum bearing rotatable about an axis relative to the structural component, the drum bearing defining an external surface of predetermined configuration;
a latch pivotally mounted on the base and having a surface configured to mate with the external surface of the drum bearing for securing the drum bearing against rotation relative to the integral structural component; and
a plunger pin mounted on the latch, wherein the plunger pin includes an end portion disposable into the peripheral depression for securing the cable feed mechanism to the integral structural component, and wherein the end portion of the plunger pin is removable from the peripheral depression for releasing the cable feed mechanism from the integral structural component.

19. The drain cleaning apparatus of claim 18,
wherein the drum bearing defines a hexagonal surface configuration.

20. The drain cleaning apparatus of claim 18,
further including a hinge pin mounted on the base;
wherein the latch, pivotably mounted on the hinge pin, is movable between an open position and a closed position for enabling, when in the closed position, the end portion of the plunger pin to be disposed into the peripheral depression for securing the cable feed mechanism to the integral structural component.

21. The drain cleaning apparatus of claim 20,
wherein the latch includes an arcuate exterior surface and a collar extending radially inwardly from the arcuate surface for securing the bearing axially relative to the integral structural component when the latch is in the closed position.

22. The drain cleaning apparatus of claim 20,
further including a second plunger pin mounted on the base;
wherein the cable feed mechanism includes a second mounting pin defining a longitudinal axis and defining a second peripheral depression;
wherein the base defines a second bore axially-aligned relative to and dimensioned to receive the second mounting pin; and
wherein the second plunger pin includes an end portion which, when disposed into the second peripheral depression, secures the cable feed mechanism to the integral structural component when the latch is in the closed position.

23. The drain cleaning apparatus of claim 18,
wherein the base defines an aperture located adjacent the bore and oriented transverse thereto,
wherein the mounting pin is longitudinally disposed into the bore,
wherein the plunger pin is disposed into the aperture, and
wherein the end portion of the plunger pin engages the peripheral depression, for securing the cable feed mechanism to the integral structural component.

24. The drain cleaning apparatus of claim 18,
further including a second plunger pin mounted on the base;
wherein the cable feed mechanism includes a second mounting pin defining a longitudinal axis and defining a second peripheral depression;
wherein the base defines a second bore axially-aligned relative to and dimensioned to receive the second mounting pin; and
wherein the second plunger pin has an end portion disposable into the second peripheral depression of the second mounting pin for securing the cable feed mechanism to the integral structural component.

25. A drain cleaning apparatus comprising:
an integral structural component defining a base and a frame integral with the base;
a cable feed mechanism including at least two spaced-apart mounting pins, each defining a longitudinal axis and a respective peripheral depression, wherein the base defines at least two bores, dimensioned and axially aligned to receive the at least two mounting pins;
a drum mounted on the integral structural component and including a drum bearing rotatable about an axis relative to the structural component, the drum bearing defining an external surface of predetermined configuration;
a latch pivotally mounted on the base and having a surface configured to mate with the external surface of the drum bearing for securing the drum bearing against rotation relative to the integral structural component; and
a plunger pin mounted on the latch, wherein the plunger pin includes an end portion disposable into one of the at least two peripheral depressions for securing the cable feed mechanism to the integral structural component, and wherein the end portion of the plunger pin is removable from the one of the at least two peripheral depressions for releasing the cable feed mechanism from the integral structural component.

26. The drain cleaning apparatus of claim 25,
wherein the at least two spaced-apart mounting pins are each elongated and extend parallel from the cable feed mechanism.

27. The drain cleaning apparatus of claim 25,
wherein the drum bearing defines a hexagonal surface configuration.

28. The drain cleaning apparatus of claim 25,
wherein the base defines an aperture located adjacent one of the at least two bores and oriented transverse thereto,
wherein one of the at least two mounting pins is longitudinally disposed into the one of the at least two bores that is adjacent the aperture,
wherein the plunger pin is disposed into the aperture, and
wherein the end portion of the plunger pin engages the one of the at least two peripheral depressions, for securing the cable feed mechanism to the integral structural component.

29. The drain cleaning apparatus of claim 25,
further including a hinge pin mounted on the base;
wherein the latch, pivotably mounted on the hinge pin, is movable between an open position and a closed position for enabling, when in the closed position, the end portion of the plunger pin to be disposed into one of the at least two peripheral depressions for securing the cable feed mechanism to the integral structural component.

30. The drain cleaning apparatus of claim 29,
wherein the latch includes an arcuate exterior surface and a collar extending radially inwardly from the arcuate surface for securing the bearing axially relative to the integral structural component when the latch is in the closed position.

31. The drain cleaning apparatus of claim 29,
wherein the integral structural component defines an aperture located adjacent and oriented transverse to one of the at least two bores,
wherein the plunger pin is spring-biased toward the one of the at least two bores,
wherein each of the at least two mounting pins has a chamfered end portion that enables each of the at least two mounting pins, when spaced from the integral structural component, to be guided when inserted into associated respective ones of the at least two bores, and
wherein the chamfered end portion of one of the at least two mounting pins, when inserted into an associated one of the at least two bores and when the latch is in the closed position, engages and urges the plunger pin away from the associated bore for enabling the cable feed mechanism to be brought into abutting engagement with and secured to the integral structural component.

32. The drain cleaning apparatus of claim 31,
further including a second plunger pin mounted on the base and oriented transverse to another of the at least two bores,
wherein the second plunger pin is spring-biased and urged into at least one of the two bores by an end portion of the latch when in the closed position, and
wherein the chamfered end portion of another of the at least two mounting pins, when inserted into the at least one of the two bores with the latch in the closed position, engages and urges the second plunger pin away from the other bore for enabling the cable feed mechanism to be brought into abutting engagement with and secured to the integral structural component.

* * * * *